US011572530B2

(12) United States Patent
Clark et al.

(10) Patent No.: US 11,572,530 B2
(45) Date of Patent: Feb. 7, 2023

(54) REMOVAL OF PAINT FROM POROUS, SMOOTH, AND MINERALOGICALLY FRAGILE SURFACES

(71) Applicant: Colorado Mesa University, Grand Junction, CO (US)

(72) Inventors: Sara R. Clark, Lakewood, CO (US); Ali Lange, Rock Springs, WY (US); Savanna J. Peake, Colorado Springs, CO (US); Yasmin Shashova, Grand Junction, CO (US); Andrew R. Wolff, Fruita, CO (US)

( * ) Notice: Subject to any disclaimer, the term of this patent is extended or adjusted under 35 U.S.C. 154(b) by 94 days.

(21) Appl. No.: 16/853,390

(22) Filed: Apr. 20, 2020

(65) Prior Publication Data
US 2020/0332228 A1 Oct. 22, 2020

Related U.S. Application Data

(60) Provisional application No. 62/836,045, filed on Apr. 18, 2019.

(51) Int. Cl.
| | | |
|---|---|---|
| C11D 7/10 | (2006.01) | |
| C11D 7/24 | (2006.01) | |
| C11D 7/26 | (2006.01) | |
| C11D 3/22 | (2006.01) | |
| C11D 3/00 | (2006.01) | |
| C11D 11/00 | (2006.01) | |
| C11D 3/20 | (2006.01) | |
| C11D 3/10 | (2006.01) | |
| C11D 7/12 | (2006.01) | |

(52) U.S. Cl.
CPC ............ C11D 3/222 (2013.01); C11D 3/0047 (2013.01); C11D 3/10 (2013.01); C11D 3/2079 (2013.01); C11D 7/12 (2013.01); C11D 7/268 (2013.01); C11D 11/0029 (2013.01); C11D 11/0052 (2013.01)

(58) Field of Classification Search
CPC .. C11D 3/10; C11D 3/222; C11D 7/12; C11D 7/268

USPC ............... 510/174, 201, 202, 209, 474, 509
See application file for complete search history.

(56) References Cited

U.S. PATENT DOCUMENTS

| | | | | |
|---|---|---|---|---|
| 4,643,840 A | * | 2/1987 | Brocklehurst | C09D 9/00 134/38 |
| 5,288,335 A | * | 2/1994 | Stevens | C09D 9/04 106/173.01 |
| 2003/0119686 A1 | * | 6/2003 | Machac, Jr. | C11D 3/2093 510/201 |
| 2005/0130858 A1 | * | 6/2005 | Hurley | C09D 9/005 510/206 |
| 2005/0148490 A1 | * | 7/2005 | Krzysik | A61Q 19/10 510/490 |
| 2005/0202982 A1 | * | 9/2005 | Perlman | A61K 8/4973 510/118 |
| 2006/0058208 A1 | * | 3/2006 | Ventura | C09D 9/005 510/201 |
| 2006/0234890 A1 | * | 10/2006 | Griese | C09D 9/005 510/214 |
| 2007/0129276 A1 | * | 6/2007 | Albright | C09D 9/005 510/201 |
| 2008/0051314 A1 | * | 2/2008 | Wenzel | A61Q 5/02 510/507 |
| 2009/0281012 A1 | * | 11/2009 | Trivedi | C08G 65/3314 510/138 |
| 2010/0069281 A1 | * | 3/2010 | Guignot | C11D 3/0094 510/245 |
| 2013/0210691 A1 | * | 8/2013 | Albright | C09D 9/005 510/100 |
| 2014/0206590 A1 | * | 7/2014 | Han | C11D 3/24 510/202 |
| 2019/0382689 A1 | * | 12/2019 | Murphy | C11D 3/2065 |
| 2020/0332228 A1 | * | 10/2020 | Clark | C11D 3/2079 |

* cited by examiner

*Primary Examiner* — Gregory R Delcotto
(74) *Attorney, Agent, or Firm* — Sheridan Ross P.C.

(57) ABSTRACT

Compositions and methods of the invention are directed to the removal of solid films, and particularly paint layers, from substrates, and particularly smooth, porous, and/or mineralogically fragile substrates such as sandstone. The compositions include cooked aqueous solutions of starch. The compositions can advantageously remove paints and other unwanted solid films from these and other substrates without damaging the substrate itself.

16 Claims, No Drawings

REMOVAL OF PAINT FROM POROUS, SMOOTH, AND MINERALOGICALLY FRAGILE SURFACES

CROSS-REFERENCE TO RELATED APPLICATION

This application claims the benefit of priority under 35 U.S.C. § 119(e) to U.S. Provisional Patent Application 62/836,045, filed 18 Apr. 2019, the entirety of which is incorporated herein by reference.

FIELD OF THE INVENTION

This invention pertains generally to the removal of solid films from substrates, and specifically to the removal of paint or other unwanted solid film substances from substrates, especially porous and/or mineralogically fragile surfaces including but not limited to sandstone.

BACKGROUND OF THE INVENTION

Removal of paint and other substances that form solid films on substrates is frequently necessary, in applications ranging from the repainting of the substrate for aesthetic purposes to the remediation of graffiti and other types of vandalism. Commonly used compositions and methods for removing these solid films, however, are often unsuitable for use on porous, mineralogically fragile, or otherwise difficult substrates, e.g. sandstone, and in these applications, painting over or otherwise obscuring the solid film may be the only presently available, cost-effective option. Such an option is frequently unacceptable, e.g. where the substrate is part of a natural rock formation or similar feature and the very motivation for removal is to preserve the natural aesthetic of the substrate.

Those removal compositions and methods that are available suffer from many drawbacks. By way of non-limiting example, some methods use abrasives to mechanically blast or scrape the film away from the surface of the substrate, which may damage a porous or mineralogically fragile substrate and be ineffective at removing those portions of the unwanted substance that have seeped into pores or otherwise penetrated below the immediate surface of the substrate. Other methods may remove solid film layers that a user may wish to leave in place, or use compositions that themselves leave an undesired film or coating on the substrate that must be removed or remediated by other means. Still other compositions and methods may require significant manual effort (e.g. agitating, brushing, scraping, scrubbing, washing, wiping, etc.) to take effect, and/or may include caustic, toxic, or otherwise dangerous or undesirable chemicals.

There is thus a need in the art for compositions and methods for removing paint or other unwanted solid films from porous and/or mineralogically fragile substrates that leave the structure and aesthetics of the substrate substantially intact, leave in place any desired film layers, do not deposit additional unwanted films or coatings, take effect with minimal manual effort, and do not employ toxic or otherwise dangerous or undesirable chemicals.

SUMMARY OF THE INVENTION

It is one aspect of the present invention to provide a paint remover composition, made by the method comprising (a) providing an aqueous solution of starch, wherein a concentration of starch in the solution is between about 3 wt % and about 13 wt %; and (b) cooking the aqueous solution at a temperature of above about 75° C. until gelatinized.

In embodiments, the concentration of starch may be between about 7 wt % and about 11 wt %.

In embodiments, the method may further comprise (c) cooling the cooked aqueous solution to a temperature between about room temperature and about 80° C.

In embodiments, the composition may comprise between about 0.01 wt % and about 0.9 wt % of sucrose.

In embodiments, the starch may be at least about 50% amylopectin by weight.

In embodiments, the starch may be at least about 50% amylose by weight.

In embodiments, the composition may comprise at least one pH modifier selected from the group consisting of sodium acetate, sodium carbonate, and sodium bicarbonate.

In embodiments, the composition may have a pH of between about 5.5 and about 8.5.

In embodiments, the composition may have a pH of between about 7 and about 13.

It is another aspect of the invention to provide a method for removing at least a portion of a solid film from a substrate, comprising (a) providing a film remover composition; (b) applying the film remover composition, at a temperature between about room temperature and about 80° C., to the solid film; and (c) drying the substrate for at least about 2 hours, wherein the film remover composition comprises an aqueous solution of starch in which a concentration of starch is between about 3 wt % and about 13 wt %.

In embodiments, the solid film may comprise paint. The paint may, but need not, be selected from the group consisting of a spray paint, a combination or mixture of paint and primer, a polyurethane paint, a house paint, an acrylic paint, and combinations and mixtures thereof.

In embodiments, the substrate may be at least one of smooth, porous, and mineralogically fragile. The substrate may, but need not, comprise at least one material selected from the group consisting of sandstone, river rock, concrete, brick, granite, marble, limestone, a polymorph of calcium carbonate other than limestone or marble, aluminum, and steel.

In embodiments, at least one of the following may be true: (i) the starch has been pre-gelatinized prior to addition to the aqueous solution; and (ii) the aqueous solution has previously been cooked at a temperature above about 75° C. until substantially all of the starch has been gelatinized.

In embodiments, the starch may be at least about 50% amylopectin by weight.

In embodiments, the starch may be at least about 50% amylose by weight.

In embodiments, the film remover composition may further comprise at least one pH modifier selected from the group consisting of sodium acetate, sodium carbonate, and sodium bicarbonate.

In embodiments, the film remover composition may have a pH of between about 5.5 and about 8.5.

In embodiments, the film remover composition may have a pH of between about 7 and about 13.

In embodiments, the film remover composition may have a pH of between about 8 and about 10.

It is another aspect of the present invention to provide a paint remover composition, made by the method comprising adding a pre-gelatinized starch to an aqueous solvent to form a solution, wherein a concentration of the pre-gelatinized starch in the solution is between about 3 wt % and about 13 wt %.

In embodiments, the starch may be at least about 50% amylopectin by weight or at least about 50% amylose by weight.

In embodiments, the paint remover composition may comprise at least one pH modifier selected from the group consisting of sodium acetate, sodium carbonate, and sodium bicarbonate.

In embodiments, the paint remove composition may have a pH of between about 5.5 and about 13.

While specific embodiments and applications of the present invention have been illustrated and described, it is to be understood that the invention is not limited to the precise configuration and components described herein. Various modifications, changes, and variations which will be apparent to those skilled in the art may be made in the arrangement, operation, and details of the methods and systems of the present invention disclosed herein without departing from the spirit and scope of the invention. It is important, therefore, that the claims be regarded as including any such equivalent construction insofar as they do not depart from the spirit and scope of the present invention.

The advantages of the present invention will be apparent from the disclosure contained herein.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

As used herein, unless otherwise indicated, the term "mineralogically fragile" refers to mineral-containing substrates that are susceptible to debridement or other physical damage when exposed to high-pressure fluid treatment (e.g. pressure-washing). Examples of mineralogically fragile substrates include, but are not limited to, sandstone, calcium carbonate minerals of any polymorph (e.g. calcite, aragonite, chalk, lime, limestone, marble, pearl, etc.), granite, river rock, concrete, and brick.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

The present inventors have developed compositions and methods for removal of paint and other unwanted solid films from non-porous, porous, and/or mineralogically fragile substrates, specifically compositions and methods comprising cooked aqueous starch solutions. The present inventors have discovered that compositions of this type successfully remove paint from a variety of surfaces, including sandstone and other non-porous, porous and/or mineralogically fragile surfaces without the need for significant manual effort, allowing the inventors to remove paint films easily and without damaging the underlying substrate. Aspects of the present invention are thus directed to methods and systems for removing paint using cooked aqueous starch solutions, as well as the compositions themselves.

The compositions and methods of the present disclosure are effective to remove paint and other unwanted solid films from a wide variety of non-porous, porous, smooth and/or mineralogically fragile substrates, particularly metal and mineral substrates. By way of first non-limiting example, the substrate may be sandstone. By way of second non-limiting example, the substrate may be river rock. By way of third non-limiting example, the substrate may be concrete. By way of fourth non-limiting example, the substrate may be brick having a relatively high surface roughness. By way of fifth non-limiting example, the substrate may be brick having a relatively low surface roughness. By way of sixth non-limiting example, the substrate may be granite. By way of seventh non-limiting example, the substrate may be marble. By way of eighth non-limiting example, the substrate may be wood. By way of ninth non-limiting example, the substrate may be a metal, including but not limited to aluminum and/or steel.

The compositions and methods of the present disclosure are effective to remove a wide variety of unwanted solid films, particularly paints, from porous and/or mineralogically fragile substrates. By way of first non-limiting example, the unwanted solid film may comprise matte spray paint of any color. By way of second non-limiting example, the unwanted solid film may comprise glossy spray paint of any color. By way of third non-limiting example, the unwanted solid film may comprise a combination or mixture of paint of any color and primer. By way of fourth non-limiting example, the unwanted solid film may comprise polyurethane paint of any color. By way of fifth non-limiting example, the unwanted solid film may comprise house paint of any color. By way of sixth non-limiting example, the unwanted solid film may comprise nail polish of any color. By way of seventh non-limiting example, the unwanted solid film may comprise acrylic paint of any color. By way of eighth non-limiting example, the unwanted solid film may comprise permanent marker (e.g. Sharpie®) ink of any color.

The compositions of the present disclosure may comprise any one or more of a wide variety of starches. By way of first non-limiting example, the compositions may comprise corn starch, and in particular embodiments may include one or more of a high-amylose corn starch, a high-amylopectin corn starch, a pre-gelatinized corn starch, and a liquid corn starch. By way of second non-limiting example, the compositions may comprise potato starch. By way of third non-limiting example, the compositions may comprise rice starch. By way of fourth non-limiting example, the compositions may comprise mung bean flour. By way of fifth non-limiting example, the compositions may comprise water chestnut flour. By way of sixth non-limiting example, the compositions may comprise tapioca starch.

In the compositions of the present invention, the starch may be present in any concentration between about 0.5 wt % and about 13.5 wt %, typically between about 3 wt % and about 11 wt %, more typically between about 6 wt % and about 10 wt %, and most typically between about 7 wt % and about 9 wt %. A range of concentrations of the starch in the compositions of the present invention may be between about any half of a weight percent from about 0.5 wt % to about 13 wt % and about any other half of a weight percent from about 0.5 wt % to about 13 wt %. The concentration of starch in the composition may be at least about 0.5 wt %, at least about 1 wt %, at least about 1.5 wt %, at least about 2 wt %, at least about 2.5 wt %, at least about 3 wt %, at least about 3.5 wt %, at least about 4 wt %, at least about 4.5 wt %, at least about 5 wt %, at least about 5.5 wt %, at least about 6 wt %, at least about 6.5 wt %, at least about 7 wt %, at least about 7.5 wt %, at least about 8 wt %, at least about 8.5 wt %, at least about 9 wt %, at least about 9.5 wt %, at least about 10 wt %, at least about 10.5 wt %, at least about 11 wt %, at least about 11.5 wt %, at least about 12 wt %, at least about 12.5 wt %, or at least about 13 wt %. The concentration of starch in the composition may be no more than about 13.5 wt %, no more than about 13 wt %, no more than about 12.5 wt %, no more than about 12 wt %, no more than about 11.5 wt %, no more than about 11 wt %, no more than about 10.5 wt %, no more than about 10 wt %, no more than about 9.5 wt %, no more than about 9 wt %, no more than about 8.5 wt %, no more than about 8 wt %, no more than about 7.5 wt %, no more than about 7 wt %, no more than about 6.5 wt %, no more than about 6 wt %, no more than about 5.5 wt %, no more than about 5 wt %, no more than about 4.5 wt %, no more than about 4 wt %, no more than about 3.5 wt %, no more than about 3 wt %, no more than about 2.5 wt %, no more than about 2 wt %, no more than about 1.5 wt %, or no more than about 1 wt %. It is to be expressly understood that in some embodiments, the starch content of compositions of the present disclosure may be even higher, e.g. up to at least about 20 wt %, when the starch is a modified starch or has been degraded or chain-shortened by exposure to an acid or enzyme.

One of the advantages of the compositions and methods of the present disclosure is that they can be effective to remove solid films from substrates without removing portions of or otherwise damaging the substrate itself. Particularly, conventional methods, devices, and compositions for removing paint and similar solid films can cause peeling, flaking, warping, cracking, etc. of the substrate, either as a result of the composition physically adhering or chemically bonding to the substrate or as a result of physical debridement (e.g. as a result of sanding or pressure-washing). The compositions and methods of the present disclosure, by contrast, are chemically suitable for causing lifting and removal of the solid film without affecting the underlying substrate, and do not require intense pressure, abrasion, or other destructive methods of physical application. Thus, smooth, porous, and/or mineralogically fragile substrates (e.g. sandstone, limestone, etc.) can be treated with the compositions and methods of the present disclosure to remove solid films therefrom, without risk of damage to the substrate itself.

The disclosure now being generally described will be more readily understood by reference to the following examples, which are included merely for the purposes of illustration of certain aspects of the embodiments of the present disclosure. The examples are not intended to limit the disclosure, as one of skill in the art would recognize from the above teachings and the following examples that other techniques and methods can satisfy the claims and can be employed without departing from the scope of the claimed disclosure.

In the Examples that follow, unless otherwise indicated, the extent of paint removal has been calculated by computerized visual inspection. Particularly, unless otherwise indicated, ImageJ, a Java-based image processing program developed by the National Institutes of Health, was used to process images of the test samples to determine the proportion of the area of test samples over which paint or other solid film was removed.

Example 1

Use of 3% and 7% Cornstarch Solutions on Spray-Painted Sandstone

Flat segments of sandstone collected near Palisade, Colo. were spray-painted with black ColorPlace gloss spray paint until one face of each segment was completely covered with paint. A 3% cornstarch solution was made by combining 6.071 g of cornstarch with 194.055 g of tap water, and the 3% solution was (with moderate stirring) heated to boiling at approximately 90° C., cooked at between 80° C. and 90° C. for 8-10 minutes, brought back to the boiling point briefly, and allowed to cool to approximately 40° C. A 7% cornstarch solution was made by combining 14.025 g of cornstarch with 186.730 g of tap water, and the 7% solution was (with moderate stirring, increasing upon gelatinization) heated to gelatinization at approximately 80° C., cooked at between 80° C. and 90° C. for approximately 15 minutes, and allowed to cool to approximately 40° C.; about 2 g of undissolved cornstarch remained in the mixing vessel after this procedure.

Each of six painted sandstone segments was weighed and sprayed, using a spray bottle, with one of the two cornstarch solutions to ensure complete coverage of the painted surface with a generous quantity of solution, then reweighed to determine the mass of solution applied; two control (painted but not exposed to cornstarch solution) segments were also weighed for comparison. The sandstone segments were then allowed to dry in ambient conditions for approximately 72 hours.

Visual inspection of the rock segments indicated that on portions of the painted surface of segments exposed to the 7% solution, the paint had been noticeably lifted and bubble-like features had formed. Compared to the control segments, segments treated with either cornstarch solution had a "glossier" look, but no other changes were visually evident on the segments exposed to the 3% cornstarch solution. All segments were then weighed, gently brushed with a manual toothbrush, and reweighed to determine the mass of spray paint and dried starch removed.

Results of the mass measurements of the sandstone segments are given in Table 1.

TABLE 1

| Rock segment | Solution applied | Mass before application (g) | Mass after application (g) | Mass before paint removal (g) | Mass after paint removal (g) | Mass of material removed (g) |
|---|---|---|---|---|---|---|
| 1 | 3% | 54.522 | 55.575 | 54.5807 | 54.5703 | 0.0104 |
| 2 | 3% | 87.817 | 89.379 | 87.8664 | 87.8420 | 0.0244 |
| 3 | 3% | 121.919 | 124.193 | 121.9866 | 121.9273 | 0.0593 |
| 4 | None | 82.765 | — | 82.8048 | 82.7807 | 0.0241 |
| 5 | 7% | 106.938 | 116.135 | 107.5243 | 106.4378 | 1.0865 |
| 6 | 7% | 133.450 | 143.762 | 134.2265 | 133.3451 | 0.8814 |
| 7 | 7% | 75.214 | 85.828 | 76.0232 | 75.0819 | 0.9413 |
| 8 | None | 86.969 | — | 87.0072 | 86.9979 | 0.0093 |

A second layer of the 7% solution was applied via finger spreading to the segments that had previously been treated with the 7% solution and allowed to dry for approximately 96 hours, with mass measurements taken as before. Results of these measurements are given in Table 2.

TABLE 2

| Rock segment | Mass before application (g) | Mass after application (g) | Mass before paint removal (g) | Mass after paint removal (g) | Mass of material removed (g) |
|---|---|---|---|---|---|
| 5 | 106.431 | 111.663 | 106.6828 | 106.1294 | 0.5534 |
| 6 | 133.336 | 139.737 | 133.6931 | 133.0908 | 0.6023 |
| 7 | 75.054 | 81.558 | 75.3640 | 74.8220 | 0.5420 |

An average of 1.4% of the total mass of paint was lifted from the 3% cornstarch treated sandstone samples, and an average of 95.5% of the total mass of paint was lifted from the 7% cornstarch treated sandstone samples. These data indicate that while a 3% cornstarch solution is not significantly more effective at removing paint from sandstone in a single application than a control, a 7% cornstarch solution noticeably removes paint from sandstone.

Example 2

Use of 5% and 9% Cornstarch Solutions on Spray-Painted Sandstone

Flat segments of sandstone collected near Palisade, Colo. were spray-painted with black ColorPlace gloss spray paint until one face of each segment was completely covered with paint. A 5% cornstarch solution was made by combining 9.999 g of cornstarch with 190.738 g of tap water, and the 5% solution was cooked at between 80° C. and 90° C. for approximately 15 minutes and otherwise prepared according to the procedure described in Example 1. A 9% cornstarch solution was made by combining 18.062 g of cornstarch with 182.087 g of tap water, and the 9% solution was cooked at between 80° C. and 90° C. for approximately 20 minutes and otherwise prepared according to the procedure described in Example 1.

Each of six spray-painted sandstone segments was weighed and coated with a layer of one of the two cornstarch solutions using a popsicle stick, then reweighed to determine the mass of solution applied; two control (painted but not exposed to cornstarch solution) segments were also weighed for comparison. The sandstone segments were then allowed to dry in ambient conditions for approximately 72 hours.

Visual inspection of the rock segments indicated that on large areas of the painted surface of segments exposed to the 9% solution, the paint had been noticeably lifted. Compared to the control segments, segments treated with either cornstarch solution had a "glossier" look and in some places a semi-transparent film, but no other changes were visually evident on the segments exposed to the 5% cornstarch solution. It was observed that on both groups of treated segments, a greater proportion of paint remained on the rougher and more sedimentary portions of the sandstone. All segments were then weighed, gently brushed with a manual toothbrush, and reweighed to determine the mass of dried starch and spray paint removed.

Results of the mass measurements of the sandstone segments are given in Table 3.

TABLE 3

| Rock segment | Solution applied | Mass before application (g) | Mass after application (g) | Mass before paint removal (g) | Mass after paint removal (g) | Mass of material removed (g) |
|---|---|---|---|---|---|---|
| 1 | 5% | 120.694 | 129.595 | 121.1884 | 120.7158 | 0.4726 |
| 2 | 5% | 178.135 | 187.504 | 178.7007 | 178.5043 | 0.1964* |
| 3 | 5% | 229.074 | 239.846 | 229.6288 | 229.0822 | 0.5466 |
| 4 | None | 104.669 | — | 104.6813 | 104.6767 | 0.0046 |
| 5 | 9% | 118.506 | 129.265 | 119.4998 | 118.2230 | 1.2768 |
| 6 | 9% | 123.076 | 134.017 | 124.1125 | 122.8894 | 1.2231 |
| 7 | 9% | 179.959 | 192.772 | 181.1177 | 179.5609 | 1.5568 |
| 8 | None | 89.205 | — | 89.1965 | 89.1777 | 0.0188 |

Paint was lifted from smaller areas of segments exposed to the 5% solution than on segments exposed to the 9% solution, and paint was more loosely attached to segments exposed to the 9% solution. On Segment 2, the removed material was primarily a translucent white layer of remaining solution material rather than paint.

An average of 51.7% of the total mass of paint was lifted from the 5% cornstarch treated sandstone samples, and an average of 71.2% of the total mass of paint was lifted from the 9% cornstarch treated sandstone samples. These data indicate that a 9% cornstarch solution is more effective at removing paint from sandstone than a 5% cornstarch solution.

Example 3

Use of 9% and 11% Cornstarch Solutions on Spray-Painted Sandstone

Flat segments of sandstone collected near Palisade, Colo. were spray-painted with black ColorPlace gloss spray paint until one face of each segment was completely covered with paint. A 9% cornstarch solution was made by combining 18.007 g of cornstarch with 182.533 g of tap water, then subsequently prepared according to the procedure described in Example 2. An 11% cornstarch solution was made by combining 22.016 g of cornstarch with 178.492 g of tap water, then subsequently prepared according to the procedure described in Example 2.

Each of eight painted sandstone segments was weighed and coated with a layer of one of the two cornstarch solutions using a popsicle stick, then reweighed to determine the mass of solution applied; the solution was applied warm (approximately 40° C.) to Segments 1-6 and at room temperature to Segments 7 and 8. The sandstone segments were then allowed to dry in ambient conditions for approximately 92 hours.

Paint was lifted in sheets that were larger for the warm solutions than for the room temperature solutions. All segments were then weighed, gently brushed with a manual toothbrush, and reweighed to determine the mass of dried starch and spray paint removed.

Results of the mass measurements of the sandstone segments are given in Table 4.

TABLE 4

| Rock segment | Solution applied | Mass before application (g) | Mass after application (g) | Mass before paint removal (g) | Mass after paint removal (g) | Mass of material removed (g) |
|---|---|---|---|---|---|---|
| 1 | 9% warm | 101.890 | 109.222 | 102.5581 | 101.7061 | 0.8520 |
| 2 | 9% warm | 102.571 | 111.770 | 103.4612 | 102.4577 | 1.0035 |
| 3 | 9% warm | 90.212 | 96.427 | 90.8100 | 90.1322 | 0.6778 |
| 4 | 11% warm | 73.339 | 79.533 | 74.0608 | 73.2781 | 0.7827 |
| 5 | 11% warm | 70.880 | 80.476 | 72.0006 | 70.8172 | 1.1834 |
| 6 | 11% warm | 65.765 | 74.225 | 66.7395 | 65.6384 | 1.1011 |
| 7 | 11% RT | 30.900 | 37.908 | 31.7302 | 30.8091 | 0.9211 |
| 8 | 9% RT | 61.603 | 69.359 | 62.3250 | 61.6498 | 0.6752 |

Paint was generally removed more cleanly from segments exposed to the 9% solutions than those exposed to the 11% solutions, and speckling of paint residue left behind was not consistent; it is hypothesized that speckling may depend, at least in part, on the porosity of the substrate. An average of 42.6% of the total mass of paint was lifted from the warm 9% cornstarch treated sandstone samples, and an average of 46.4% of the total mass of paint was lifted from the warm 11% cornstarch treated sandstone samples. Additionally, an average of 63.3% of the total mass of paint was lifted from the room temperature 9% treatments, and an average of 26.4% of the total mass of paint was lifted from the room temperature 11% treatments. These data indicate that a 9% cornstarch solution is more effective at removing paint from sandstone than an 11% cornstarch solution.

Example 4

Effect of Paint Layering on Removal of Paint from Sandstone by 9% Cornstarch Solution The surface of a large, flat segment of sandstone collected near Palisade, Colo. was divided into four portions of approximately equal area; one portion was unpainted, and the other three portions were spray-painted with one, two, and three coats, respectively, of black ColorPlace gloss spray paint. A 9% cornstarch solution was made by combining 18 g of cornstarch with 182 g of tap water and otherwise prepared according to the procedure described in Example 1.

The cornstarch solution was applied to the surface of the sandstone segment using a popsicle stick. The mass of the segment was measured as 273.543 g before application and 306.981 g after application, giving a mass of applied solution of 33.438 g. The segment was then allowed to dry in ambient conditions for approximately 92 hours.

Visual inspection of the rock segment indicated no difference in the effectiveness of the 9% solution at removing one, two, or three layers of paint. The segment was gently brushed with a manual toothbrush; its mass was measured as 276.695 g prior to brushing and 272.669 g after removing, giving a mass of dried starch and paint removed of 4.026 g. A second application of the 9% cornstarch solution yielded an overall 85.0% total mass of paint lifted on the entire sandstone surface.

Example 5

Use of Cellulose Ester Solutions on Spray-Painted Sandstone

Flat segments of sandstone collected near Palisade, Colo. were spray-painted with black ColorPlace gloss spray paint until one face of each segment was completely covered with paint. Starch solutions were made by slowly adding ReCell™ HE10MD hydroxyethyl cellulose polymer (Bio-Polymer Industries, Tulsa, Okla.) to tap water while constantly stirring and gently heating the mixture; the stirring and heating was continued until the solution clarified at a temperature of approximately 40 to 45° C., whereupon it was allowed to cool slightly. Three solutions of this type (5%, 7%, and 9% starch, respectively) were made.

Each of nine painted sandstone segments was weighed and coated with a layer of one of the three solutions using a plastic knife, then reweighed to determine the mass of solution applied. The sandstone segments were then allowed to dry in ambient conditions for approximately 72 hours and weighed again.

Visual inspection of the rock segments indicated that no paint was lifted from any segments. Results of the mass measurements of the sandstone segments are given in Table 5.

TABLE 5

| Rock segment | Solution applied | Mass before application (g) | Mass after application (g) | Mass of dry sample (g) |
|---|---|---|---|---|
| 1 | 9% | 110.523 | 122.062 | 110.617 |
| 2 | 9% | 117.673 | 127.343 | 118.503 |
| 3 | 9% | 46.929 | 54.827 | 47.272 |
| 4 | 7% | 83.986 | 91.450 | 84.179 |
| 5 | 7% | 50.731 | 57.970 | 51.209 |
| 6 | 7% | 57.945 | 64.034 | 58.346 |
| 7 | 5% | 58.368 | 67.046 | 58.747 |
| 8 | 5% | 50.113 | 55.302 | 50.340 |
| 9 | 5% | 75.058 | 82.428 | 75.348 |

It is to be noted that the inventors attempted to make solutions of PAC-R carboxymethyl cellulose (CMC) and ReCell™ HP10 hydroxypropyl cellulose by the same method described in this Example, but such solutions would not homogenize and were deemed unsuitable. The data of this example indicate that PAC-R CMC, ReCell™ HP10, and ReCell™ HE10MD polymers are not suitable for making compositions of the present invention.

Example 6

Use of Cellulose Ester/Alcohol Solutions on Spray-Painted Sandstone

Flat segments of sandstone collected near Palisade, Colo. were spray-painted with black ColorPlace gloss spray paint until one face of each segment was completely covered with paint. A 3% PAC-R CMC solution was made by combining 3.049 g of PAC-R carboxymethyl cellulose (CMC) and 10.019 g of isopropyl alcohol to form a slurry, which was then added to 91.040 g of tap water while heating gently and stirring constantly; the mixture gelled after about 10 seconds, with small globules that appeared to homogenize after cooling. A 10% ReCell™ HP10 hydroxypropyl cellulose solution was made by combining approximately 5 g of ReCell' HP10 with approximately 10 g of isopropyl alcohol to form a slurry, which was then added to approximately 90 g of tap water while stirring constantly and heating gently until homogeneous.

Each of six painted sandstone segments was weighed and coated with a layer of one of the two solution; the PAC-R CMC solution, which had the form of a gel, was applied at room temperature using a plastic knife, while the HP10 solution was a liquid and applied by pouring at about 30° C. The sandstone segments were then reweighed to determine the mass of solution applied and allowed to dry in ambient conditions for approximately 96 hours.

Visual inspection of the rock segments indicated that both solutions left a semi-transparent white film on the surface of the sandstone. No paint appeared to have been removed or lifted from the surface of any segment, but an attempt was made to remove any lifted paint from the surface by gently brushing with a manual toothbrush.

Results of the mass measurements of the sandstone segments are given in Table 6.

TABLE 6

| Rock segment | Solution applied | Mass before application (g) | Mass after application (g) | Mass before paint removal (g) | Mass after paint removal (g) | Mass of material removed (g) |
| --- | --- | --- | --- | --- | --- | --- |
| 1 | PAC-R CMC | 43.336 | 50.931 | 43.441 | 43.359 | 0.082 |
| 2 | PAC-R CMC | 42.757 | 51.386 | 42.857 | 42.741 | 0.116 |
| 3 | PAC-R CMC | 102.715 | 110.453 | 103.190 | 103.179 | 0.011 |
| 4 | HP10 | 58.178 | 65.822 | 58.343 | 58.258 | 0.085 |
| 5 | HP10 | 28.273 | 31.603 | 28.455 | 28.423 | 0.032 |
| 6 | HP10 | 90.337 | 96.408 | 90.679 | 90.621 | 0.058 |

These data indicate that cellulose ester solutions are ineffective at removing paint and leave a greater quantity of residue remaining on the surface of the substrate than cornstarch solutions.

Example 7

Use of 9% Cornstarch Solution on Spray-Painted Sandstone Bearing Petroglyph

Using scissors, a petroglyph-type pattern was etched into a flat segment of sandstone collected near Palisade, Colo., which was then spray-painted with black ColorPlace gloss spray paint until the face bearing the petroglyph was completely covered with paint. A 9% cornstarch solution was made according to the procedure of Example 2, with a cooking time of approximately 15 minutes, and the solution was applied to the segment at a temperature of about 40° C. The mass of the sandstone segment was measured as 108.393 g before application and 118.271 g after application, giving a mass of applied solution of 9.878 g. The segment was allowed to dry in ambient conditions for approximately 72 hours.

After gentle brushing of the surface with a manual toothbrush, only a small portion of the petroglyph was visible under the unremoved paint, but the petroglyph itself appeared to be chemically and physically unaffected. Similar to previous Examples, remaining paint was left behind in a "speckled" pattern. The mass of the segment was measured as 109.2867 g before brushing and 108.2668 g after brushing, giving a mass of paint and starch residue removed of 1.0199 g.

A thicker second coat of 9% cornstarch solution, having a total mass of 12.9382 g, was applied to the surface of the segment, and the segment was then allowed to dry for approximately 96 hours. Visual inspection indicated relatively little additional paint removal and only a slight increase in the visibility of the petroglyph. The mass of the segment was measured as 109.541 g before gentle brushing with a manual toothbrush and 109.068 g afterward, giving a total mass of material removed of 0.473 g. An average of 48.9% of the total mass of paint was lifted from the sample after two coats.

Example 8

Effect of Paint Layering on Removal of Paint from Sandstone by 9% Cornstarch Solution The painting and solution preparation procedure described in Example 4 was repeated. The mass of the segment was measured as 224.695 g before application of the solution and 257.726 g after application, giving a mass of applied solution of 33.031 g. The segment was then allowed to dry in ambient conditions for approximately 72 hours.

Visual inspection of the rock segment indicated that no difference in the effectiveness of the 9% solution at removing one, two, or three layers of paint, and paint was effectively lifted and/or removed from approximately 95% of the surface regardless of the number of paint layers. The segment was gently brushed with a manual toothbrush; its mass was measured as 227.743 g prior to brushing and 223.552 g after removing, giving a mass of paint removed of 4.191 g. The sandstone segment and samples of the removed paint were collected and stored for further analysis.

A second layer of the 9% cornstarch solution, having a total mass of 32.577 g, was applied and the segment was again allowed to dry for approximately 72 hours, in an attempt to remove additional paint. The mass of the segment was 226.883 g before brushing and 221.702 g after brushing, giving a total mass of removed material of 5.181 g. After the second coat, 96.4% of the total mass of paint was lifted from the entire sample. The painted rock (but not the unpainted rock) was visually determined to be darker after this second application of solution; without wishing to be bound by any particular theory, it is believed that this is due to oxidation of the rock by the spray paint.

Example 9

Use of Sucrose Plasticizer on Paint Removal from Sandstone by 9% Cornstarch Solution Flat segments of sandstone collected near Palisade, Colo. were spray-painted with black ColorPlace gloss spray paint until one face of each segment was completely covered with paint. A plasticized 9% cornstarch solution was made by combining 18.123 g of cornstarch and 0.926 g (approximately 5% of the weight of the cornstarch, or 0.45% of the total solution weight) of sucrose with 182.378 g of tap water, and the solution was otherwise prepared according to the procedure described in Example 2, with a cooking time of approximately 15 minutes, subsequent manual stirring with a glass stir rod, and a few minutes of cooling.

Each of three painted sandstone segments was weighed and coated with a layer of the plasticized cornstarch solution, then reweighed to determine the mass of solution applied; the sandstone segments were then allowed to dry in ambient conditions for approximately 96 hours.

Visual inspection of the rock segments indicated no significant difference in paint lifting compared to the unplasticized 9% cornstarch solution of earlier Examples. All segments were weighed, gently brushed with a manual toothbrush, and reweighed to determine the mass of dried starch and spray paint removed.

Results of the mass measurements of the sandstone segments are given in Table 7.

TABLE 7

| Rock segment | Mass before application (g) | Mass after application (g) | Mass before paint removal (g) | Mass after paint removal (g) | Mass of material removed (g) |
|---|---|---|---|---|---|
| 1 | 138.499 | 148.303 | 139.2689 | 138.3074 | 0.9615 |
| 2 | 94.890 | 107.252 | 96.0121 | 94.6572 | 1.3549 |
| 3 | 66.180 | 75.758 | 67.0898 | 66.1146 | 0.9752 |

An average of 58.8% of the total mass of paint was lifted from the samples after a single coat.

Example 10

Paint Removal from Sandstone by 9% Amylopectin Cornstarch Solution

Flat segments of sandstone collected near Palisade, Colo. were spray-painted with black ColorPlace gloss spray paint until one face of each segment was completely covered with paint. A 9% amylopectin cornstarch solution was made by combining 8.993 g of amylopectin cornstarch (Amioca Powder, Ingredion Inc., Bridgewater, N.J.) with 91.683 g of tap water. The solution was gently stirred to break up chunks of starch at the bottom of the vessel, heated (while stirring) over 10 minutes to a gelation temperature of about 63° C., then allowed to cool slightly. The resulting gel was viscous, elastic, and "slimy," much like a latex composition.

Each of three painted sandstone segments was weighed and coated with a layer of the amylopectin cornstarch solution using a plastic knife, then reweighed to determine the mass of solution applied; the sandstone segments were then allowed to dry in ambient conditions for nine days.

Visual inspection of the rock segments indicated lifting and removal across approximately 44% of the surface of the segments, but not as much of the paint was removed as with some earlier 9% cornstarch solutions. In areas where paint was removed, a glossy film was left behind. All segments were weighed, gently brushed with a manual toothbrush, and reweighed to determine the mass of dried starch and spray paint removed.

Results of the mass measurements of the sandstone segments are given in Table 8.

TABLE 8

| Rock segment | Mass before application (g) | Mass after application (g) | Mass before paint removal (g) | Mass after paint removal (g) | Mass of material removed (g) |
|---|---|---|---|---|---|
| 1 | 100.271 | 111.149 | 101.2580 | 100.0818 | 1.1702 |
| 2 | 113.023 | 119.851 | 113.6756 | 113.0278 | 0.6478 |
| 3 | 119.839 | 129.398 | 120.7056 | 120.3745 | 0.3311 |

Example 11

Paint Removal from Sandstone by 9% High-Amylose Cornstarch Solution

Flat segments of sandstone collected near Palisade, Colo. were spray-painted with black ColorPlace gloss spray paint until one face of each segment was completely covered with paint. A 9% cornstarch solution having high (approximately 72% of starch weight) amylose content was made by combining 8.995 g of high-amylose cornstarch (Hylon VIII cornstarch, Ingredion Inc., Bridgewater, N.J.) with 91.205 g of tap water. The solution was then prepared according to the procedure of Example 1, but maintained at a temperature of about 80° C. until applied to the sandstone segments. The solution did not gelatinize and remained relatively inviscid (i.e. liquid-like).

Each of three painted sandstone segments was weighed and coated with a layer of the amylopectin cornstarch solution by pouring; as the solution was applied unevenly, the mass of the segments after application was not recorded. The solution appeared to gelatinize slightly while cooling on the surface of the sandstone, but remained less viscous compared to the amylopectin solution of Example 10. The sandstone segments were then allowed to dry in ambient conditions for approximately 96 hours.

Visual inspection of the rock segments indicated no lifting or removal of spray paint, and deposition of a brittle, white film that remained in inconsistent, cracked pockets across the surface of the segments; the film was not strongly adhered to the surface and could be easily removed. In areas where paint was removed, a glossy film was left behind. All segments were weighed, gently brushed with a manual toothbrush, and reweighed to determine the mass of dried starch and spray paint removed.

Results of the mass measurements of the sandstone segments are given in Table 9.

TABLE 9

| Rock segment | Mass before application (g) | Mass before paint removal (g) | Mass after paint removal (g) | Mass removed (g) |
|---|---|---|---|---|
| 1 | 62.025 | 62.3745 | 62.1525 | 0.2220 |
| 2 | 102.828 | 103.6267 | 102.7586 | 0.8681 |
| 3 | 195.161 | 196.2905 | 195.2886 | 1.0019 |

Without wishing to be bound by any particular theory, it is believed that high-amylose solutions may be effective to remove spray paint if made to gel more substantially than in this Example.

Example 12

Effect of pH Modification on Removal of Paint from Sandstone by Cornstarch Solution Flat segments of sandstone collected near Palisade, Colo. were spray-painted with black ColorPlace gloss spray paint until one face of each segment was completely covered with paint. A 5% cornstarch solution having an approximately neutral pH was made according to the procedure described in Example 2. To make a basic 5% cornstarch solution, 0.636 g of sodium carbonate ($Na_2CO_3$), 0.338 g of sodium bicarbonate ($NaHCO_3$), and 100.374 g of reverse osmosis (RO) water were combined to form approximately 100 mL of a solution, to which was added 5.052 g of cornstarch; this solution was stirred briefly with a glass stir rod and heated (with stirring) for 10 minutes to 85° C., then allowed to cool briefly before application. To make an acidic 5% cornstarch solution, 0.411 g of sodium acetate ($CH_3COONa$), 6.007 g of glacial acetic acid ($CH_3COOH$), and 94.32 g of water were combined to form approximately 100 mL of a solution, to which was added 5.014 g of cornstarch; this solution was stirred briefly with a glass stir rod and heated (with stirring) for 11.5 minutes to 83° C., then allowed to cool briefly before application. As determined by litmus paper tests, the pH of the basic solution was approximately 10 and the pH of the acidic solution was approximately 4. The acidic solution did not gel and was more inviscid than the neutral and basic solutions.

Each of nine painted sandstone segments was weighed and coated with a layer of one of the three solutions using a plastic knife, then reweighed to determine the mass of solution applied The sandstone segments were then allowed to dry in ambient conditions for approximately 72 hours.

Visual inspection of the rock segments indicated that the neutral solution performed as expected based on the results of previous Examples; some lifting of paint was observed, but the solution was not as effective as 7% and 9% solutions made previously. One of three segments (Segment 9) exposed to the basic solution exhibited some paint lifting (~90%); the other two segments exhibited a slight film deposition, but no paint lifting. None of the three segments exposed to the acidic solution exhibited paint lifting, but all exhibited film deposition. The three segments exposed to the neutral solution had an average of 48.2% of the total mass of paint lifted. All segments were weighed, gently brushed with a manual toothbrush, and reweighed to determine the mass of dried starch and spray paint removed.

Results of the mass measurements of the sandstone segments are given in Table 10.

TABLE 10

| Rock segment | Solution applied | Mass before application (g) | Mass after application (g) | Mass before paint removal (g) | Mass after paint removal (g) | Mass of material removed (g) |
|---|---|---|---|---|---|---|
| 1 | Acidic | 52.321 | 55.301 | 52.4746 | 52.4709 | 0.0037 |
| 2 | Acidic | 238.352 | 243.282 | 238.403 | 238.403 | — |
| 3 | Acidic | 174.196 | 181.520 | 174.6060 | 174.5970 | 0.0090 |
| 4 | Neutral | 80.406 | 86.353 | 80.7889 | 80.1682 | 0.6207 |
| 5 | Neutral | 314.060 | 327 (est.) | 314.659 | 314.319 | 0.34 |
| 6 | Neutral | 185.716 | 202.262 | 186.7605 | 185.5105 | 1.2500 |
| 7 | Basic | 41.687 | 46.720 | 42.0090 | 41.9857 | 0.0233 |
| 8 | Basic | 179.874 | 190.784 | 180.5985 | 180.5172 | 0.0813 |
| 9 | Basic | 226.811 | 238.428 | 227.5708 | 226.6912 | 0.8796 |

Example 13

Treatment of Aged Painted Sandstone by Cornstarch Solution

An 8% cornstarch solution was prepared according to the procedure described in Example 2. This solution was applied, after three minutes of cooling, to sandstone samples painted with either black or white spray paint that had been allowed to age at ambient conditions for approximately four months. An average of 23.0% of the total paint was lifted from the black-painted samples after a single coat of the cornstarch solution, but little removal was observed from the white-painted samples after a single coat. After a second coat with the cornstarch solution, an average of 63.3% of the total paint was lifted from the white-painted samples.

Example 14

Treatment of Sandstone Painted with Combination Paint and Primer by Cornstarch Solution A 9% cornstarch solution was prepared according to the procedure described in Example 2. This solution was applied, after five minutes of cooling, to sandstone samples painted with a commercially available combination of green spray paint and primer. An initial coat with the cornstarch solution resulted in some visible paint removal, but not to the same extent as has been previously observed. After a second coat with the cornstarch solution, an average of 70.6% of the total paint was lifted from the samples.

Example 15

Treatment of Painted Sandstone by Pre-Gelatinized Starch Solution

A solution of pre-gelatinized cornstarch was prepared by first dissolving pre-gelatinized cornstarch in an equal mass of ethanol, then adding this solution to water until a cornstarch solution of 9% was achieved. This solution was applied to sandstone samples painted with either white spray paint or the combination green spray paint and primer described in Example 14. Little removal was observed after either a single coat or two coats; after two coats, no sample exhibited more than 20% removal.

Example 16

Effect of Starch Solution Temperature on Film Removal from Sandstone

A 9% cornstarch solution was prepared according to the procedure described in Example 2. A first portion of this solution was cooled to room temperature and subsequently reheated to 66° C., a second portion was cooled to room temperature and not reheated, and a third portion was held at approximately 68 to 72° C. for 50 minutes. All three solutions were applied to sandstone samples painted with black spray paint. The reheated first portion exhibited comparable paint removal performance to a "fresh" 9% solution, with an average removal of 73.3% of the total paint, compared to an average of 31.0% for the cooled (un-reheated) second portion. The third (constant-temperature) third portion formed a strong film on the surface of the sandstone and removed paint less effectively, with an average removal of 36.0%.

Example 17

Treatment of Painted Sandstone by Tapioca Starch Solution

A 9% tapioca starch solution was prepared according to the procedure described in Example 2, substituting tapioca starch for cornstarch. This solution was applied, after three minutes of cooling, to samples painted with black spray paint. An average of 30.0% of the total paint was lifted from the samples.

Example 18

Treatment of Painted Sandstone by Potato Starch Solution

A 9% potato starch solution was prepared according to the procedure described in Example 2, substituting potato starch for cornstarch. It was observed that this solution was visibly thicker and more viscous than a 9% cornstarch solution, which the present inventors hypothesize is due at least in part to potato starch's larger granule size and different ratio of amylose to amylopectin.

This solution was applied, after three minutes of cooling, to sandstone samples painted with black spray paint. An average of 47.4% of the total paint was lifted from the black-painted samples after a single coat of the potato starch solution.

Example 19

Treatment of Painted Sandstone by Liquid Starch Solution

A pre-prepared liquid starch solution having a total solids content of 35% and a low viscosity was applied at room temperature to sandstone samples painted with black spray paint. The amount of paint removed from these samples was negligible, even after three coats with the liquid starch solution. Without wishing to be bound by any particular theory, the inventors hypothesize that the enzymatic breakdown of starch to allow a 35% solution to be sufficiently low viscosity to allow easy use may have reduced the starch polymer chain length to the point where it was ineffective.

Example 20

Treatment of Painted Sandstone by Potato Starch Solution

The experiment of Example 18 was repeated, except that the temperature of the solution was held between about 60 and about 63° C. until application to the sandstone samples. An average of 24.1% of the total paint was lifted from the black-painted samples after a single coat of the potato starch solution, indicating decreased removal effectiveness compared to the cooled potato starch solution of Example 18.

Example 21

Effect of Application Temperature on Tapioca Starch Solution Effectiveness

The experiment of Example 17 was repeated, except that three separate portions of the tapioca starch solution were allowed to cool for three, six, and nine minutes, respectively, prior to application to the sandstone samples. This variation appeared to have relatively little overall effect on paint removal effectiveness; the average proportion of the total paint removed from the sandstone samples was 50.2% for the solution cooled for three minutes, 51.0% for the solution cooled for six minutes, and an average of approximately 60.6% for the solution cooled for nine minutes.

Example 22

Treatment of White-Painted Sandstone by Cornstarch Solution

A 9% cornstarch solution was prepared according to the procedure described in Example 2. This solution was applied, after ten minutes of cooling, to three sandstone samples painted with white spray paint. A negligible amount of paint was removed from the sandstone samples after a single application.

The same samples were then applied with a second coat of an identical solution that had been allowed to cool for about 3.5 minutes before application. While the second coat improved the paint removal effectiveness of the solution, the results varied widely between samples; two of the samples exhibited removal of 21.3% and 18.8%, respectively, but the third exhibited removal of 85.5%.

The same experiment was subsequently repeated, with a first coat of cornstarch solution applied after approximately five minutes and fifteen seconds of cooling; like the initial coat of the first experimental run, negligible paint removal was observed. The same samples were then applied with a second coat of an identical solution that had been allowed to cool for about five minutes before application. While the second coat improved the paint removal effectiveness of the solution, the results varied widely between samples; two of the samples exhibited removal of 84.5% and 61.0%, respectively, but the third exhibited removal of about 27% (estimated by visual inspection).

Example 23

Treatment of Painted Sandstone by Rice Starch Solution

A 9% rice starch solution was prepared according to the procedure described in Example 2, substituting rice starch for cornstarch. It was observed that this solution was visibly less viscous than a 9% potato starch solution, which the present inventors hypothesize is due at least in part to rice starch's smaller granule size compared to potato starch.

This solution was applied, after three, six, or nine minutes of cooling (resulting in application temperatures of 74.9° C., 61.7° C., and 51.0° C., respectively), to sandstone samples painted with black spray paint. The solution cooled for three minutes removed an average of 54.3% of the total paint, the solution cooled for six minutes removed an average of 75.1% of the total paint, and the solution cooled for nine minutes removed an average of 22.4% of the total paint.

Example 24

Treatment of Painted Rough Brick by Cornstarch Solution

A 9% cornstarch solution was prepared according to the procedure described in Example 2. This solution was applied, at a temperature of between about 55° C. and about 61° C., to samples of rough brick (including some residual mortar) painted with black spray paint. While an average of only about 5% of the total paint was lifted from the brick itself, an average of about 30% of the total paint was lifted from the mortar (both measurements estimated visually). The present inventors hypothesize that this difference is due to the difficulty of applying the relatively thick and viscous solution to the narrow depressions within the ribbed surface of the rough brick.

Given these initial results, a second cornstarch solution was prepared according to the procedure described in Example 2, except that the cornstarch concentration was reduced to 4% to provide a less viscous solution. This solution was applied, at a temperature of between about 59° C. and about 63° C., to the same samples of brick. This second coat appeared to "reactivate" at least a portion of the residual 9% solution, as more paint was removed than expected (approximately 45-50% of the total original paint from the mortar and approximately 15-20% of the total original paint from the brick itself). A second coat of the 4% solution (third coat overall) resulted in no additional paint removal.

Example 25

Effect of Application Temperature on Combined Paint/Primer Removal Effectiveness The experiment of Example 14 was repeated, except that the application temperature of the solution was varied. Specifically, a first group of samples received a first coat of cornstarch solution at 68° C. and a second coat at 61° C.; a second group of samples received a first coat of solution at 66° C. and a second coat at 60° C.; and a third group of samples received a first coat of solution at 63° C. and a second coat at 58° C. Visual estimation indicated that paint removal effectiveness increased with decreasing temperature; the first group of samples exhibited average total paint removal of about 36%, the second group of samples exhibited average total paint removal of about 60%, and the third group of samples exhibited average total paint removal of about 91%.

Example 26

Treatment of Painted Sandstone by Basic High-Amylose Solution

A 9% solution of 72% amylose starch was prepared according to the procedure described in Example 2, except that strong base was added to increase the pH of the solution to pH 12. This increase in pH was successful in dissolving the high-amylose starch. This solution was applied at 65° C. to sandstone samples painted with black spray paint. No paint removal was observed, and the present inventors hypothesize that this is due to the failure of the high-amylose solution to gelatinize.

Example 27

Effect of Application Temperature on Potato Starch Solution Effectiveness

The experiment of Example 18 was repeated, except that the application temperature of the solution was varied (58.1° C., 54.2° C., or 48.7° C.). Samples that received the 58.1° C. solution exhibited average total paint removal of 38.0%. Samples that received the 54.2° C. solution exhibited average total paint removal of 52.854%. Samples that received the 48.7° C. solution exhibited average total paint removal of 10.6%.

Example 28

Treatment of Painted River Rock by Cornstarch Solution

A 9% cornstarch solution was prepared according to the procedure described in Example 2. This solution was applied, after about five minutes of cooling, to three samples of river rock painted with black spray paint. While no quantitative data were recorded, visual inspection qualitatively revealed that only one of three samples exhibited a significant quantity of paint removal; the other two samples exhibited a smaller degree of removal. After application of a second coat of the cornstarch solution (with about five minutes of cooling after solution preparation), the first of these samples was quantitatively determined to exhibit removal of 91.90% of the paint, while the second and third examples exhibited removal of 31.40% and 33.55%, respectively.

This experiment was subsequently repeated to broadly similar results. In the second run of the experiment, quantitative data were not recorded after the first coat of cornstarch solution was applied, but it was observed that all three samples exhibited a noticeable degree of paint removal, with one exhibiting apparent removal of at least about half of the total paint. Quantitative measurement after application of the second coat of cornstarch solution indicated that an average of 62.9% of total paint was removed from the three samples, with all three samples exhibiting removal of more than half of the paint (minimum 54.9%).

Example 29

Treatment of Painted Sealed Wood Siding by Cornstarch Solution

A 9% cornstarch solution was prepared according to the procedure described in Example 2. This solution was applied at a temperature of 64.5° C. to samples of sealed wood siding painted with black spray paint. A negligible fraction of the total paint was lifted from the black-painted samples after a single coat of the cornstarch solution. After a second coat with the cornstarch solution at an application temperature of 62.3° C., an average of 33.2% of total paint was removed from the sealed wood siding. It was also observed that, upon application of the second coat of cornstarch solution, pieces of sealant were also removed from the siding, and portions of the wood peeled upward.

Example 30

Effect of Quantity of Cornstarch Solution on Solution Effectiveness

A 9% cornstarch solution was prepared according to the procedure described in Example 2. This solution was applied, in varying amounts, at a temperature of 60° C. to three sandstone samples painted with black spray paint; the three sandstone samples received 6.998 g, 13.521 g, and 18.211 g, respectively, of cornstarch solution. While no quantitative data were recorded, visual inspection of the three samples clearly revealed that increasing amounts of cornstarch solution increased the paint removal effectiveness.

A second coat was then applied to each sample at the same temperature, in amounts of 7.154 g, 14.480 g, and 18.600 g, respectively. Quantitative examination confirmed the initial finding that increasing amounts of cornstarch solution increased the paint removal effectiveness, with the three samples exhibiting paint removal of 19.9%, 54.9%, and 70.1%, respectively.

Example 31

Investigation of Paint Removal Mechanism by Iodine Testing

Chips of paint removed from substrates in the various preceding Examples were exposed to an iodine solution to determine whether starch was present; iodine reacts with the amylose helix of starch molecules to produce a distinctive purple color. Iodine testing of the raw chips resulted in a dark purple color on only one side of the chips, indicating the presence of starch.

The chips were rinsed thoroughly with deionized water and tested a second time to determine whether starch was bound to the paint chip or merely dried on the surface. The purple color was again seen, indicating bonding of the starch to the paint.

Finally, the chips were again rinsed with deionized water, then boiled for 30 minutes, dried, and tested once more. After boiling and drying, it was observed that a distinct layer of starch had delaminated from the surface of the chips, so this layer was removed and tested separately from the remainder of the chips. Both the distinct layer and the remainder chip again tested positive for starch, the distinct layer exhibiting a uniform purple color and the remainder chip being speckled with purple. Thus, even after the distinct/excess layer (hypothesized to be excess starch) was removed, starch remained on the chip, most likely chemically and/or physically bonded to the paint itself.

Example 32

Treatment of Painted Finished Concrete by Cornstarch Solution

A 9% cornstarch solution was prepared according to the procedure described in Example 2. This solution was applied at a temperature of 58.5° C. to samples of finished concrete painted with black spray paint. A very small fraction (not quantitatively determined) of the total paint was lifted from the black-painted samples after a single coat of the cornstarch solution.

A second coat of the same solution was applied to the same samples at a temperature of 59.8° C. This second coat resulted in removal of a substantial majority (estimated by visual inspection to be about 83% on average) of the paint. Significant peeling of the paint film was also observed after application of the second coat.

This experiment was repeated using a single coat of 9% cornstarch solution at an application temperature of 59.9° C. A fraction (estimated by visual inspection to be 30% on average) of the total paint was lifted from the concrete samples.

This experiment was repeated using a single coat of 7% cornstarch solution at an application temperature of 60° C. The fraction of the total paint lifted from the concrete samples was estimated by visual inspection to be about 50% for two of the three tested samples and about 25% for the third sample.

Example 33

Treatment of Painted Sandstone by Mung Bean Flour Solution

A 9% mung bean flour solution was prepared according to the procedure described in Example 2, substituting mung bean flour for cornstarch. This solution was applied at a temperature of 60° C. to sandstone samples painted with black spray paint. An average of 9.7% of the total paint was lifted from the black-painted samples after a single coat of the mung bean flour solution. A second run of the same experiment resulted in a similar degree of paint removal (13.0% average).

Example 34

Treatment of Painted Sandstone by Water Chestnut Flour Solution

A 9% water chestnut flour solution was prepared according to the procedure described in Example 2, substituting water chestnut flour for cornstarch. This solution was applied at a temperature of 60° C. to sandstone samples painted with black spray paint. An average of 34.543% of the total paint was lifted from the black-painted samples after a single coat of the starch solution.

Example 35

Treatment of Painted Sanded or Filed Wood Siding by Cornstarch Solution

A 9% cornstarch solution was prepared according to the procedure described in Example 2. This solution was applied at a temperature of 60.1° C. to samples of sanded wood siding painted with black spray paint. An average of 52.45% of the total paint was lifted from the black-painted samples after a single coat of the cornstarch solution. It was observed that application of the corn starch solution caused the edges of the wood siding, but not of the paint itself, to peel upwardly, and that portions of the wood siding were removed together with the paint due to the adhesion between the paint and the sanded wood siding.

The same solution was applied at a temperature of 59.8° C. to samples of filed wood siding painted with black spray paint. An average of 50.75% of the total paint was lifted from the black-painted samples after a single coat of the cornstarch solution. It was observed that application of the corn starch solution caused both the paint and the wood siding itself to peel upwardly, and that portions of the wood siding were removed together with the paint.

Example 36

Treatment of Painted Finished Granite by Cornstarch Solution

A 7% cornstarch solution was prepared according to the procedure described in Example 2. This solution was applied at a temperature of 60.2° C. to samples of finished granite (e.g. suitable for use as a countertop material) obtained from a commercial supplier and painted with black spray paint. Upon visual inspection, the film left by the cornstarch solution appeared to be tightly adhered to the paint, and a significant quantity of the paint had peeled upwardly into tight coils. An average of 64.6% of the total paint was lifted from the black-painted samples after a single coat of the cornstarch solution.

Example 37

Treatment of Painted Unfinished Granite by Cornstarch Solution

A 7% cornstarch solution was prepared according to the procedure described in Example 2. This solution was applied at a temperature of 60.1° C. to samples of unfinished (i.e. raw or natural) granite obtained from a commercial supplier and painted with black spray paint. Upon visual inspection, the film left by the cornstarch solution appeared to be tightly adhered to the paint, and a significant quantity of the paint had peeled into brittle pieces of various sizes, which were easily removed from the granite surface. An average of 52.6% of the total paint was lifted from the black-painted samples after a single coat of the cornstarch solution.

Example 38

Treatment of Painted Aluminum by Cornstarch Solution

A 7% cornstarch solution was prepared according to the procedure described in Example 2. This solution was applied at a temperature of 60.3° C. to samples of aluminum metal painted with black spray paint. Upon visual inspection, the paint peeled away from the surface of the aluminum in relatively large pieces. An average of 75.5% of the total paint was lifted from the black-painted samples after a single coat of the cornstarch solution.

Example 39

Removal of Nail Polish from Sandstone by Cornstarch Solution

A 7% cornstarch solution was prepared according to the procedure described in Example 2. This solution was applied at a temperature of 62° C. to sandstone samples coated with one layer of L.A. Colors Color LAST black nail polish. After a week of drying, a wide range of removal was observed from each of the three sandstone samples; while two samples exhibited removal of 18.3% and 16.1% of the total nail polish, respectively, the third sample exhibited removal of 77.1% of the nail polish. The inventors hypothesize that these differences are attributable to differences in the surface roughness as well as the amount of solution applied and temperature differences during drying.

Example 40

Treatment of Painted Sandstone by Commercial Laundry Starch Solution

Faultless® "Original Hold" laundry starch at room temperature was sprayed onto sandstone samples painted with black spray paint. Three coats of laundry starch were applied, at intervals of approximately one week (to allow for drying). No lifting of paint was observed from any of the samples. The inventors hypothesize that Faultless® "Original Hold" laundry starch does not, in fact, contain starch. The ingredient list only includes the description "film former."

Example 41

Removal of Permanent Marker Ink from Sandstone by Cornstarch Solution

A 7% cornstarch solution was prepared according to the procedure described in Example 2. This solution was applied at a temperature of 60° C. to sandstone samples saturated with ink markings with a Sharpie permanent marker. The markings on the sandstone appeared somewhat faded, additionally a film formed by the cornstarch solution included a significant amount of markings from the ink after removal from the sandstone, tending to indicate that the cornstarch solution was effective to remove at least some of the permanent marker ink from the sandstone.

Example 42

Removal of Acrylic Paint from Sandstone by Cornstarch Solution

A 7% cornstarch solution was prepared according to the procedure described in Example 2. This solution was applied at a temperature of 60° C. to sandstone samples painted with Daler Rowney black acrylic paint. An average of 76.8% of the total paint was lifted from the black-painted samples after a single coat of the cornstarch solution, with all three samples exhibiting removal of more than 70%. A greater amount of paint was generally removed from flatter portions of the sandstone samples, with more residual paint remaining in the areas of edges, bumps, and crevices of the sandstone.

Example 43

Treatment of Painted Smooth Brick by Cornstarch Solution

A 7% cornstarch solution was prepared according to the procedure described in Example 2. This solution was applied at a temperature of 60° C. to samples of smooth brick painted with black spray paint. Although no quantitative data were recorded, visual inspection indicated that at least most, and possibly nearly all, of the paint remained adhered to the brick; the film formed by the cornstarch solution included little or no visible paint after removal, and there was no visually apparent loss of paint from the brick surface.

Example 44

Removal of Polyurethane Paint from Sandstone by Cornstarch Solution

A 7% cornstarch solution was prepared according to the procedure described in Example 2. This solution was applied at a temperature of 60° C. to sandstone samples painted with polyurethane paint; two coats were applied to each of two samples, while a single coat was applied to a third sample. The paint removal results varied significantly between the three samples: 97.5% of the total paint was removed from the sample to which only a single coat of the starch solution was applied, while the sample to which two coats of the starch solution were applied exhibited removal of 84.5% and 43.0%, respectively.

Example 45

Removal of Enamel Paints from Sandstone by Cornstarch Solution

A 7% cornstarch solution was prepared according to the procedure described in Example 2. This solution was applied at a temperature of about 60° C. to sandstone samples painted with either (1) interior/exterior semi-gloss enamel house paint or (2) interior/exterior oil-base satin enamel house paint. All six samples (three comprising each type of paint) were allowed to dry for one week. The oil-base paint was observed to leave a very thick coat of paint on the sandstone, and as a result the cornstarch solution lifted relatively little of the oil-base paint from the surface of the sandstone—only a top layer, estimated by visual inspection to be 10-15% of the total for each sample, was able to be removed by pulling from the surface. By contrast, the semi-gloss paint was observed to leave a thinner and "stickier" coat of paint on the sandstone, and as a result, while relatively little of the paint could be removed with a toothbrush as usual, forcible removal (i.e. by pulling) of the lifted starch/paint film resulted in estimated removal of 50-70% of the total paint from the sample of each surface. After this initial removal, each sample was coated with a second layer of cornstarch solution and again allowed to dry for a week; this resulted in minimal (5-10% of total initial paint) further removal for both types of paint.

Example 46

Two-Stage Treatment of Aged Painted Sandstone by Cornstarch Solution

Sandstone samples painted with black spray paint were "primed" with a low-concentration (3%) cornstarch solution prepared according to the procedure described in Example 2, allowed to dry, and then exposed to a higher-concentration (7%) cornstarch solution prepared according to the same procedure; each solution was applied at a temperature of 60° C. A negligible amount of paint was lifted after "priming" with the low-concentration solution. After application of the second higher-concentration solution, two of three samples exhibited removal of about 20% (estimated by visual inspection) of the total paint, while a third sample exhibited negligible (estimated by visual inspection to be about 0.2%) of the total paint.

Example 47

Treatment of Painted Steel by Cornstarch Solution

A 7% cornstarch solution was prepared according to the procedure described in Example 2. This solution was applied at a temperature of 60.3° C. to samples of steel painted with black spray paint. Upon visual inspection, the film left by the cornstarch solution appeared to be tightly adhered to the paint, and much of the paint had peeled into long, large coils that were easily removable from the surface of the steel. Notably, the cornstarch solution appeared to be approximately equally effective at removing paint from both welded and unwelded regions of the steel. While quantitative data were not recorded, the proportion of the total paint estimated (by visual inspection) to have been removed from each sample was about 85%.

Example 48

Treatment of Painted Marble by Cornstarch Solution

A 7% cornstarch solution was prepared according to the procedure described in Example 2. This solution was applied at a temperature of 60° C. to marble samples painted with black spray paint. Although no quantitative data were recorded, the resulting starch and paint film had a deep, saturated black color and lifted large areas of paint from the marble upon removal; by visual estimation, a substantial majority of the total paint was removed from each sample.

Example 49

Removal of Artist Acrylic Paint from Smooth Brick by Cornstarch Solution

A 7% cornstarch solution was prepared according to the procedure described in Example 2. This solution was applied at a temperature of 60° C. to samples of smooth brick painted with Daler Rowney black acrylic paint. A significant quantity of the film formed by the cornstarch solution remained stuck in pores and crevices of the brick after drying, and those portions of the film that could be removed carried a negligible amount of paint away from the brick.

Example 50

Repeated Application of Low-Concentration Cornstarch Solution to Painted Sandstone A 3% cornstarch solution was prepared according to the procedure described in Example 2. This solution was applied at a temperature of 60° C. to sandstone samples painted with black spray paint, with three total coats applied at intervals of approximately one week to allow for drying. Negligible paint removal was observed after application of the first and second coats, while a small degree of removal was observed after application of the third coat.

Example 51

Ash Analysis on Lifted Samples

In order to determine the amount of mineral material the solutions were lifting along with the spray-paint, an ash analysis was performed on the three different colors of paint film lifted from painted sandstone segments. The results are compared to pure paint films collected after application and drying on a polyethylene substrate. The collected film and paint chips were sent to a commercial chemical laboratory for residual ash analysis.

Results of the ash analysis on three different types of painted sandstone segments are given in Table 11.

TABLE 11

| Sample | Result (%) | Amount of sample used (mg) | Amount of mineral matter present (as ash, mg) |
| --- | --- | --- | --- |
| Black Paint Control | 0.762 | 576.44 | 4.39 |
| Black segment 1 | 35.27 | 472.16 | 166.53 |
| Black segment 2 | 15.48 | 729.42 | 112.91 |
| Green Paint Control | 8.87 | 569.08 | 50.48 |
| Green segment 1 | 10.33 | 629.21 | 65.00 |
| Green segment 2 | 10.92 | 683.69 | 74.66 |
| White Paint Control | 23.75 | 664.83 | 157.90 |
| White segment 1 | 7.12 | 695.74 | 49.54 |
| White segment 2 | 30.23 | 449.02 | 135.74 |

Without wishing to be bound by any particular theory, based on the control results, the present inventors hypothesize that the black spray-paint contains carbon black (which does not show up in the ash analysis), while the green spray-paint may contain an iron (II) pigment possibly with copper or nickel, and the white spray-paint probably contains titanium (IV) oxide. Based on the results from the sandstone segments and the amount of mineral matter present in the ash analysis, the amount of sandstone lifted during the treatment is negligible.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A paint remover composition consisting of water, between about 3 wt % and about 13 wt % starch, and optionally at least one pH modifier selected from the group consisting of sodium acetate, sodium carbonate, and sodium bicarbonate, made by the method comprising:
   (a) providing an aqueous solution consisting of water, between about 3 wt % and about 13 wt % starch, and optionally, at least one pH modifier selected from the group consisting of sodium acetate, sodium carbonate, and sodium bicarbonate; and
   (b) cooking the aqueous solution at a temperature above about 75° C. until the starch is gelatinized.

2. The composition of claim 1, wherein the concentration of starch is between about 7 wt % and about 11 wt %.

3. The composition of claim 1, wherein the method further comprises:
   (c) cooling the cooked aqueous solution to a temperature between about room temperature and about 80° C.

4. The composition of claim 1, wherein the starch is at least about 50% amylopectin by weight or at least about 50% amylose by weight.

5. The composition of claim 1, having a pH of between about 5.5 and about 13.

6. A method for removing at least a portion of a solid film from a substrate, comprising:
   (a) providing the film remover composition of claim 1;
   (b) applying the film remover composition, at a temperature between about room temperature and about 80° C., to the solid film; and
   (c) drying the substrate for at least about 2 hours.

7. The method of claim 6, wherein the solid film comprises paint.

8. The method of claim 7, wherein the paint is selected from the group consisting of a spray paint, a combination or mixture of paint and primer, a polyurethane paint, a house paint, an acrylic paint, and combinations and mixtures thereof.

9. The method of claim 6, wherein the substrate is at least one of smooth, porous, and mineralogically fragile.

10. The method of claim 9, wherein the substrate comprises at least one material selected from the group consisting of sandstone, river rock, concrete, brick, granite, marble, limestone, a polymorph of calcium carbonate other than limestone or marble, aluminum, and steel.

11. The method of claim 6, wherein at least one of the following is true:
   (i) the starch has been pre-gelatinized prior to addition to the aqueous solution; and
   (ii) the aqueous solution has previously been cooked at a temperature above 75° C. until substantially all of the starch has been gelatinized.

12. The method of claim 6, wherein the starch is at least about 50% amylopectin by weight or at least about 50% amylose by weight.

13. The method of claim 6, wherein the film remover composition has a pH of between about 5.5 and about 13.

14. A paint remover composition consisting of water, between about 3 wt % and about 13 wt % starch, and optionally at least one pH modifier selected from the group consisting of sodium acetate, sodium carbonate, and sodium bicarbonate, made by the method comprising:
   adding a pre-gelatinized starch, and optionally at least one pH modifier selected from the group consisting of sodium acetate, sodium carbonate, and sodium bicarbonate, to water to form a solution, wherein the solution consists of water, between about 3 wt % and about 13 wt % pre-gelatinized starch and optionally the at least one pH modifier.

15. The composition of claim 14, wherein the starch is at least about 50% amylopectin by weight or at least about 50% amylose by weight.

16. The composition of claim 14, having a pH of between about 5.5 and about 13.

* * * * *